(12) United States Patent
Fujino

(10) Patent No.: US 10,996,238 B2
(45) Date of Patent: May 4, 2021

(54) SURFACE ANALYZER

(71) Applicant: Shimadzu Corporation, Kyoto (JP)

(72) Inventor: Keita Fujino, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 16/787,642

(22) Filed: Feb. 11, 2020

(65) Prior Publication Data

US 2020/0319229 A1 Oct. 8, 2020

(30) Foreign Application Priority Data

Apr. 4, 2019 (JP) .............................. JP2019-072088

(51) Int. Cl.
*G01Q 10/04* (2010.01)
*G01Q 30/20* (2010.01)
*G01Q 20/02* (2010.01)

(52) U.S. Cl.
CPC ........... *G01Q 10/045* (2013.01); *G01Q 20/02* (2013.01); *G01Q 30/20* (2013.01)

(58) Field of Classification Search
CPC ....... G01Q 10/045; G01Q 20/02; G01Q 30/20
USPC .............. 250/440.11, 441.11, 442.11, 443.1; 850/1, 2, 3, 4, 5, 6
See application file for complete search history.

(56) References Cited

U.S. PATENT DOCUMENTS 5,461,605 A * 10/1995 Takimoto ............. G11B 9/1409
250/310
2014/0113828 A1* 4/2014 Gilbert .................. H01L 39/225
505/100

FOREIGN PATENT DOCUMENTS

| JP | H05-192783 A | 8/1993 |
| JP | H08-101219 A | 4/1996 |
| JP | 2001-340984 A | 12/2001 |
| JP | 2009-103776 A | 5/2009 |
| JP | 2009-188128 A | 8/2009 |
| JP | 2014-044144 A | 3/2014 |

OTHER PUBLICATIONS

Notice of Reasons for Refusal for corresponding Japanese application No. JP2019-072088, dated Aug. 19, 2019, submitted with a machine translation.

* cited by examiner

*Primary Examiner* — Nicole M Ippolito
(74) *Attorney, Agent, or Firm* — Muir Patent Law, PLLC

(57) ABSTRACT

A driving mechanism relatively displaces a measuring unit and a sample table such that a relative positional relationship between the measuring unit and the sample table is switched between a first positional relationship and a second positional relationship. In the second positional relationship, the sample table is exposed to the outside from within a lower housing. A controller includes a high voltage generation circuit that generates a high voltage to be supplied to a scanner. A first mechanical switch causes a power supply not to supply a voltage to the high voltage generation circuit in the second positional relationship.

9 Claims, 17 Drawing Sheets

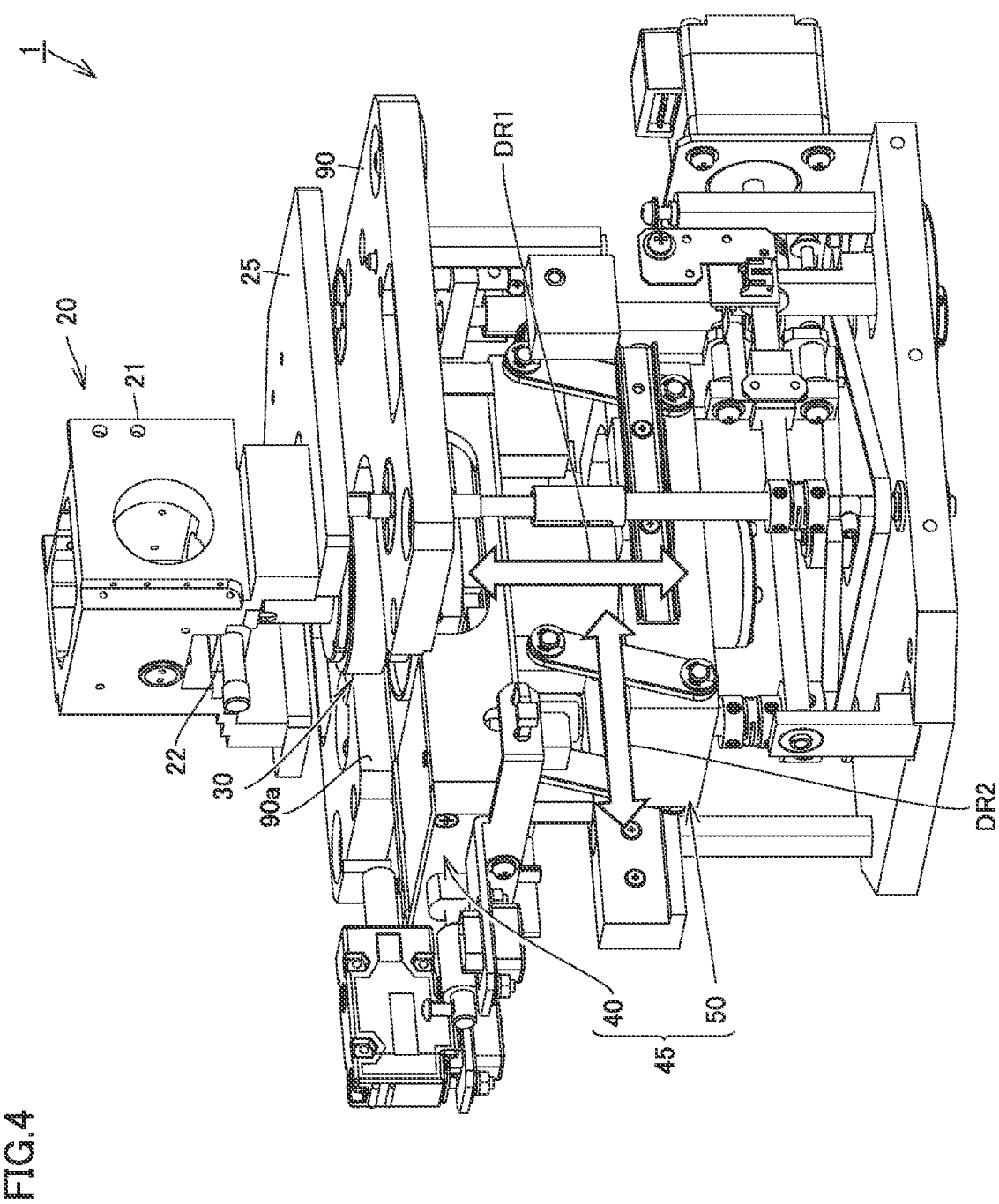

SURFACE ANALYZER

BACKGROUND OF THE INVENTION

Field of the Invention

The present invention relates to a surface analyzer.

Description of the Background Art

As a conventional analyzer, Japanese Patent Laying-Open No. 8-101219 discloses a scanning probe microscope that analyzes a microstructure on a sample surface using a cantilever provided with a probe.

In the scanning probe microscope disclosed in Japanese Patent Laying-Open No. 8-101219, a measuring unit including an optical system is movably fixed to a base fixed to a sample table with a prescribed positional relationship. At the time of measurement of a sample, the measuring unit is arranged above the sample table. The measuring unit is retracted from the position at the time of measurement, and a space for replacing the sample is thereby formed above the sample table, which can facilitate the sample replacement work.

SUMMARY OF THE INVENTION

However, when the scanning probe microscope is in a power-on state, a high voltage is being applied to a piezo scanner. Therefore, there is a possibility that the high voltage is being applied to the piezo scanner at the time of replacement of the piezo scanner. Therefore, a user must power off the scanning probe microscope at the time of replacement of the piezo scanner.

Even in a state where a cover that covers the optical system is open, a laser beam source stays on and the voltage is still being applied to the piezo scanner. Even in this state, the scanning probe microscope operates as usual. Therefore, if the user accidentally touches an observed portion or an adjustment knob of the optical microscope or the like, the scanning probe microscope may malfunction. In addition, a laser beam may be emitted in the state where the cover is open.

An object of the present invention is to provide a surface analyzer that can prevent a scanning probe microscope from malfunctioning by user operation.

A surface analyzer according to an aspect of the present invention includes: a sample table on which a sample is placed; a sample table holding unit that holds the sample table; a measuring unit including a cantilever arranged to face the sample table and a cantilever driving unit that drives the cantilever; a driving mechanism that relatively displaces the measuring unit and the sample table such that a relative positional relationship between the measuring unit and the sample table is switched between a first positional relationship and a second positional relationship; a controller; and a first mechanical switch. The sample table includes a scanner and a sample placement unit. The measuring unit is housed in an upper housing. In the first positional relationship, the sample table is housed in a lower housing. In the second positional relationship, the sample table is exposed to the outside from within the lower housing. The controller includes a high voltage generation circuit that is connected to a power supply and generates a high voltage to be supplied to the scanner. The first mechanical switch causes the power supply to supply a voltage to the high voltage generation circuit in the first positional relationship, and causes the power supply not to supply the voltage to the high voltage generation circuit in the second positional relationship.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a perspective view partially showing a configuration of measuring device 1 of the scanning probe microscope according to the embodiment inside a housing.

DESCRIPTION OF THE PREFERRED EMBODIMENTS

Figure 1:
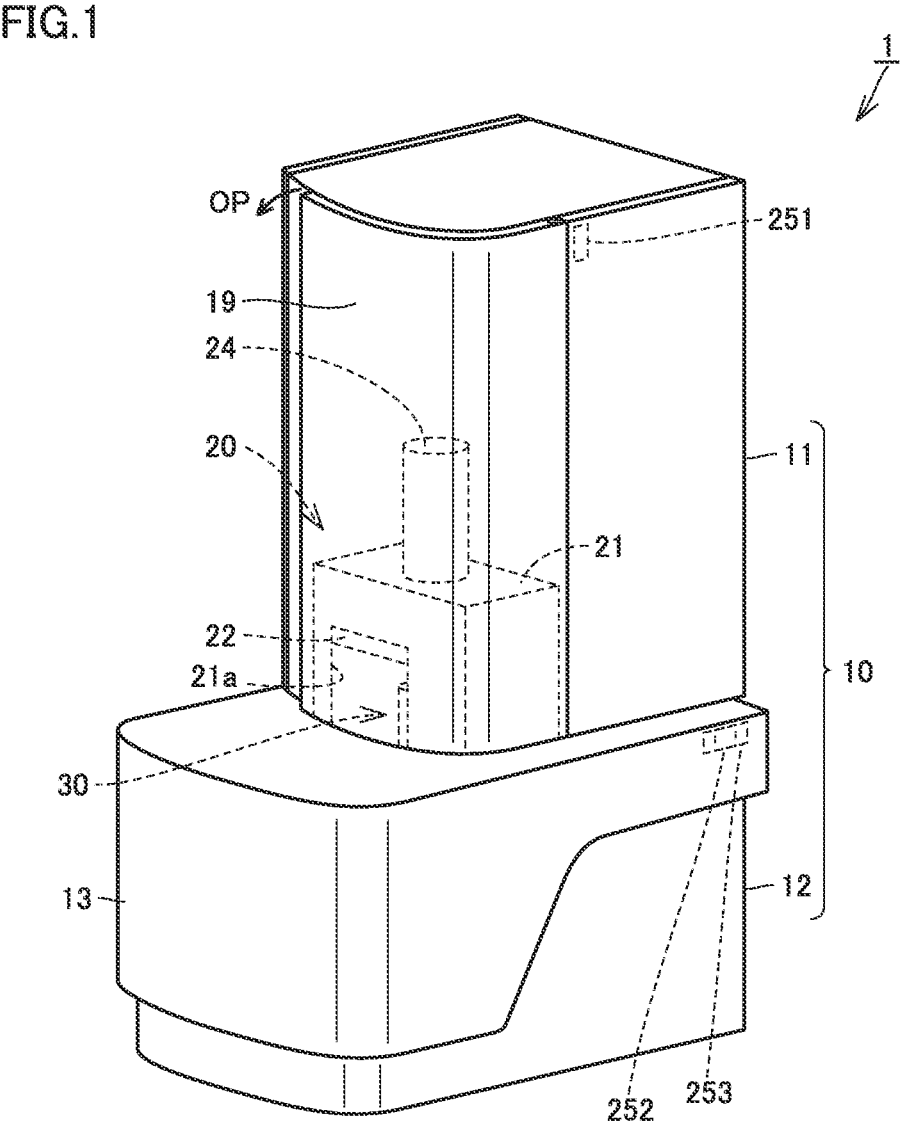
FIG. 1 is a perspective view showing a state of a measuring device 1 of a scanning probe microscope according to an embodiment at the time of measurement.

An embodiment will be described hereinafter with reference to the drawings.

In the embodiment described below, a scanning probe microscope will be described as an example of a surface analyzer. In the embodiment described below, the same or common portions are denoted by the same reference characters in the drawings and description thereof will not be repeated.

The scanning probe microscope according to the embodiment includes a measuring device which is a main body, and a controller. Hereinafter, the measuring device which is the main body of the scanning probe microscope will be described first.

Figure 2:
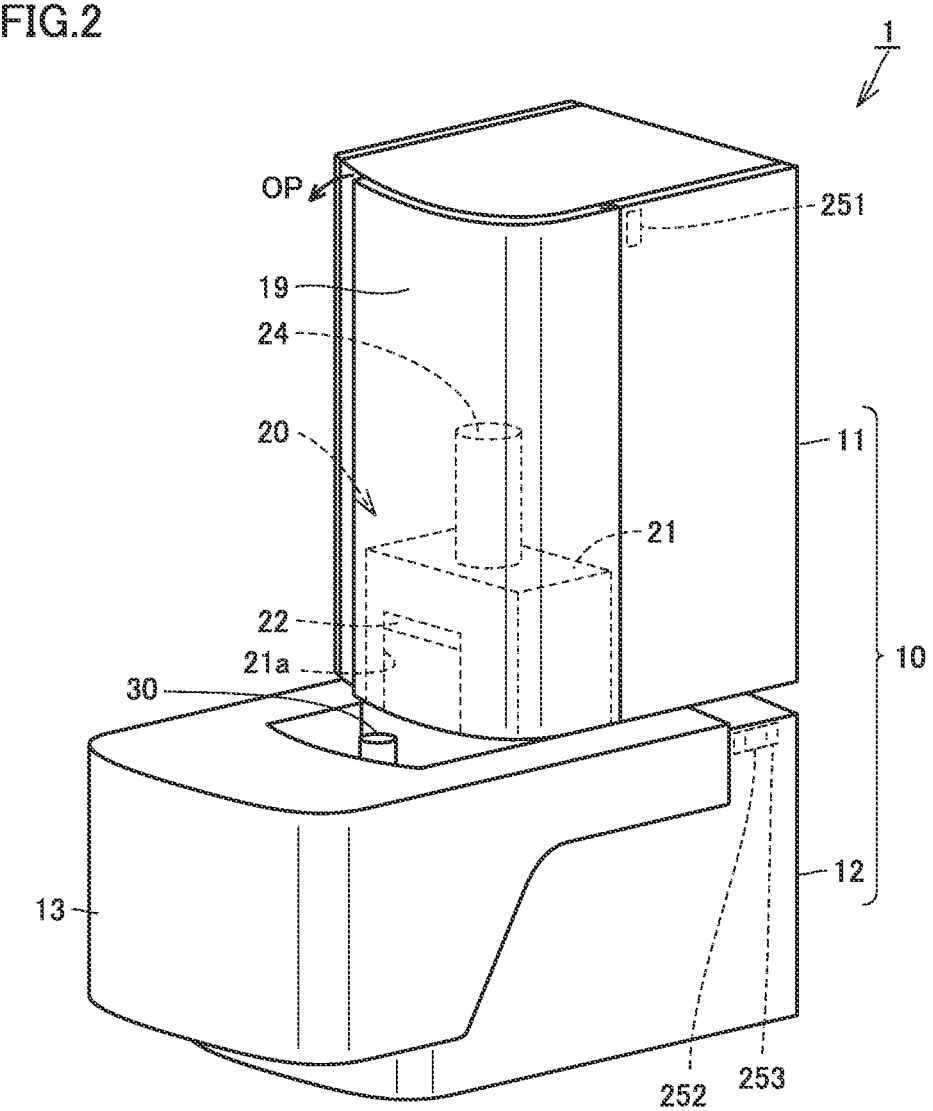
FIG. 2 is a perspective view showing a state of measuring device 1 of the scanning probe microscope according to the embodiment at the time of sample take-out or at the time of scanner replacement.
Figure 3:
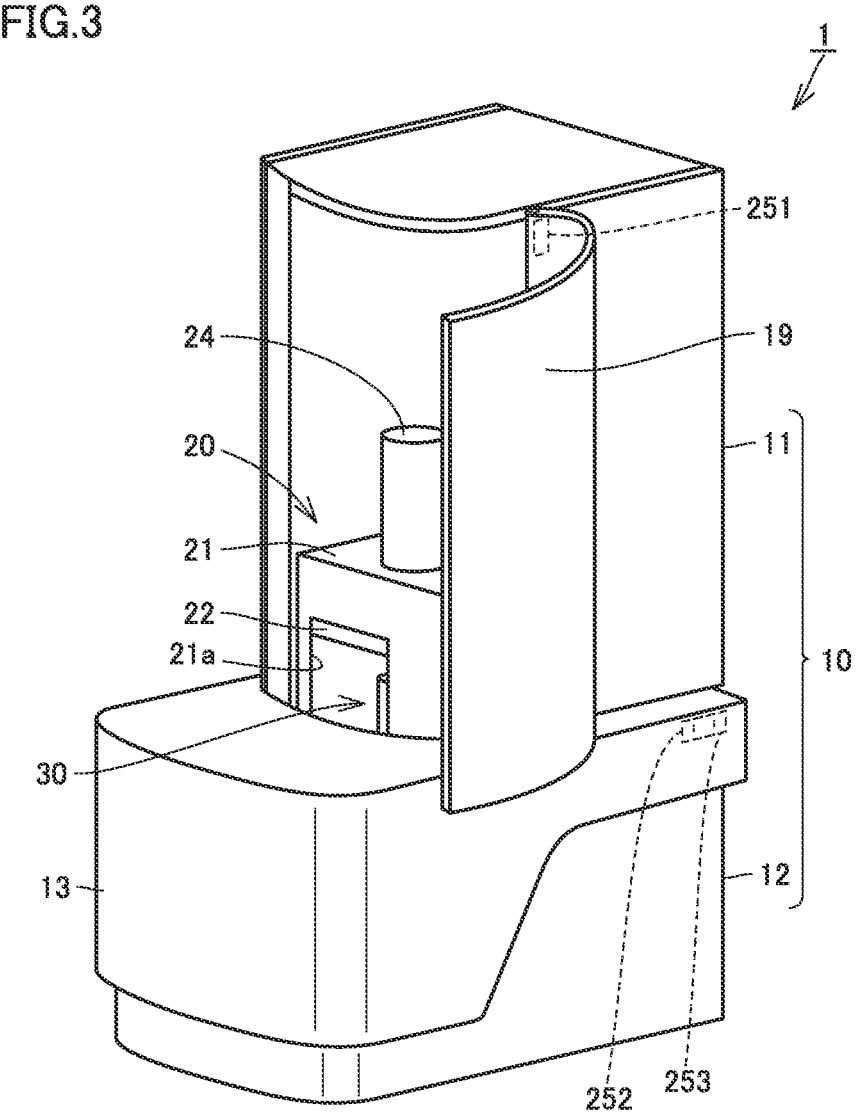
FIG. 3 is a perspective view showing a state in which a cover of measuring device 1 of the scanning probe microscope according to the embodiment is open.

FIG. 1 is a perspective view showing a state of a measuring device 1 of the scanning probe microscope according to the embodiment at the time of measurement. FIG. 2 is a perspective view showing a state of measuring device 1 of the scanning probe microscope according to the embodiment at the time of sample take-out or at the time of scanner replacement. FIG. 3 is a perspective view showing a state in which a cover of measuring device 1 of the scanning probe microscope according to the embodiment is open.

Main body (measuring device) 1 of the scanning probe microscope according to the embodiment will be described with reference to FIGS. 1 to 3.

As shown in FIG. 1, measuring device 1 of the scanning probe microscope according to the embodiment includes a housing 10, a measuring unit 20 and a sample table 30. Housing 10 includes an upper housing 11 and a lower housing 12. Upper housing 11 houses measuring unit 20 therein. Lower housing 12 is located on the lower side of upper housing 11.

As shown in FIG. 3, upper housing 11 includes a cover 19 that is freely opened and closed.

Measuring unit 20 measures a sample placed on sample table 30 from above the sample. Measuring unit 20 includes a head unit 21, a holder 22, a cantilever 23 (see FIG. 6), a cantilever driving unit 26 (see FIG. 6), and an image pickup unit 24. Head unit 21 has an opening 21a that is open frontward. Holder 22 is arranged in opening 21a. Cantilever 23 is mounted using holder 22. Cantilever 23 is arranged to face sample table 30. Cantilever 23 is arranged above sample table 30. Cantilever driving unit 26 drives cantilever 23.

A displacement detection system is housed in head unit 21. The displacement detection system includes a laser diode (see FIG. 14) that outputs a laser beam, an optical system such as a lens and a mirror that guide the laser beam to the sample, a beam splitter, a photodetector that receives a laser beam reflected by cantilever 23, and the like. Head unit 21 is also provided with, for example, a position adjustment knob for position adjustment of each component of the displacement detection system.

A window is provided in a top plate of head unit 21. Image pickup unit 24 is for supplementarily observing a surface of the sample from the window. Image pickup unit 24 is also used to adjust a position of the displacement detection system while observing a rear surface (upper surface) of cantilever 23.

Sample table 30 is a portion on which the sample is placed. Sample table 30 has a substantially cylindrical shape.

FIG. 4 is a perspective view partially showing a configuration of measuring device 1 of the scanning probe microscope according to the embodiment inside the housing.

As shown in FIG. 4, measuring device 1 of the scanning probe microscope further includes a base unit 25, a plate unit 90 and a driving mechanism 45.

Driving mechanism 45 relatively displaces measuring unit 20 and sample table 30 such that a relative positional relationship between measuring unit 20 and sample table 30 is switched between a first positional relationship and a second positional relationship.

When sample table 30 is taken out or when a scanner 32 is replaced, driving mechanism 45 changes the relative positional relationship between measuring unit 20 and sample table 30 from the first positional relationship to the second positional relationship, by relatively displacing sample table 30 with respect to measuring unit 20 such that measuring unit 20 and sample table 30 move away from each other in a first direction (up and down direction) in which cantilever 23 and sample table 30 face each other, and then, sliding sample table 30 in a second direction (front and back direction) intersecting the first direction.

The case of relatively displacing measuring unit 20 and sample table 30 by fixing the position of measuring unit 20 and moving the position of sample table 30 will be described below.

Sample table 30 is movable between a measurement position and a sample take-out and scanner replacement position. When sample table 30 is located at the measurement position, the relative positional relationship between measuring unit 20 and sample table 30 is the first positional relationship. When sample table 30 is located at the sample take-out and scanner replacement position, the relative positional relationship between measuring unit 20 and sample table 30 is the second positional relationship.

As shown in FIG. 1, sample table 30 is located at the measurement position and housed in housing 10 at the time of measurement. As shown in FIG. 2, sample table 30 is located at the sample take-out and scanner replacement position at the time of sample take-out and at the time of scanner replacement. The sample take-out and scanner replacement position is located on the lower side and on the front side of the measurement position.

At the measurement position, sample table 30 is housed in lower housing 12. When sample table 30 is located at the measurement position, measuring unit 20 can measure the sample placed on sample table 30 from above the sample.

Sample table 30 is pulled frontward together with a front unit 13 of lower housing 12, to thereby move to the sample take-out and scanner replacement position. At the sample take-out and scanner replacement position, sample table 30 is exposed to the outside from within housing 10. Therefore, the sample can be replaced or the scanner can be replaced at the sample take-out and scanner replacement position. Furthermore, the sample take-out and scanner replacement position is provided at a position that does not overlap with measuring unit 20 in the up and down direction, and thus, a sufficient work space can be ensured, which leads to improvement in workability.

Front unit 13 of lower housing 12 is slidable in the front and back direction as the second direction.

Driving mechanism 45 includes a sample table holding unit 40 that holds sample table 30, and a movement mechanism 50 that moves sample table 30.

Base unit 25 supports head unit 21. Base unit 25 has a cutout unit that is open frontward, and is provided to prevent interference with sample table 30.

Plate unit 90 is arranged below base unit 25. Plate unit 90 is arranged above sample table holding unit 40. Plate unit 90 has a cutout unit 90a that is open frontward, and is provided to prevent interference with sample table 30.

Sample table holding unit 40 holds sample table 30. Thus, by moving sample table holding unit 40 as described below, sample table 30 moves together with sample table holding unit 40.

Movement mechanism 50 moves sample table holding unit 40 such that sample table 30 moves between the measurement position and the sample take-out and scanner replacement position. Movement mechanism 50 moves up and down sample table holding unit 40 in the up and down direction (direction of an arrow DR1) such that sample table 30 moves in the up and down direction between a retracted position located below the measurement position and the measurement position. Movement mechanism 50 slides sample table holding unit 40 in the front and back direction (direction of an arrow DR2) such that sample table 30 moves between the retracted position and the sample take-out and scanner replacement position. A detailed configuration of movement mechanism 50 will be described below with reference to FIGS. 9 to 11.

Measuring device 1 includes mechanical switches 251, 252 and 253.

Mechanical switch 251 is provided on the inside of cover 19 to detect opening and closing of cover 19 of upper housing 11. Mechanical switch 252 and mechanical switch 253 are provided on the inside of lower housing 12.

Figure 5A:
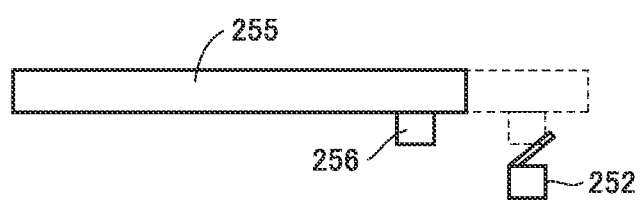
FIG. 5A is a diagram for illustrating an operation of a mechanical switch 252.
Figure 5B:
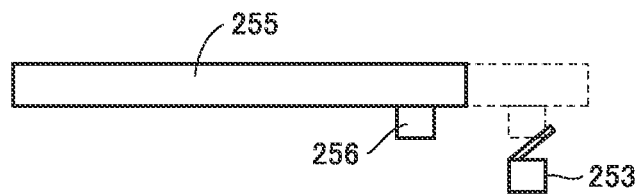
FIG. 5B is a diagram for illustrating an operation of a mechanical switch 253.

FIG. 5A is a diagram for illustrating an operation of mechanical switch 252. FIG. 5B is a diagram for illustrating an operation of mechanical switch 253.

Mechanical switch 252 and mechanical switch 253 are operated by a protrusion 256 provided on a top plate 255 of lower housing 12. Top plate 255 of lower housing 12 slides in the front and back direction as the second direction. At the time of measurement, protrusion 256 presses mechanical switch 252 and mechanical switch 253. At the time of sample take-out or scanner replacement, protrusion 256 does not press mechanical switch 252 and mechanical switch 253.

Figure 6:
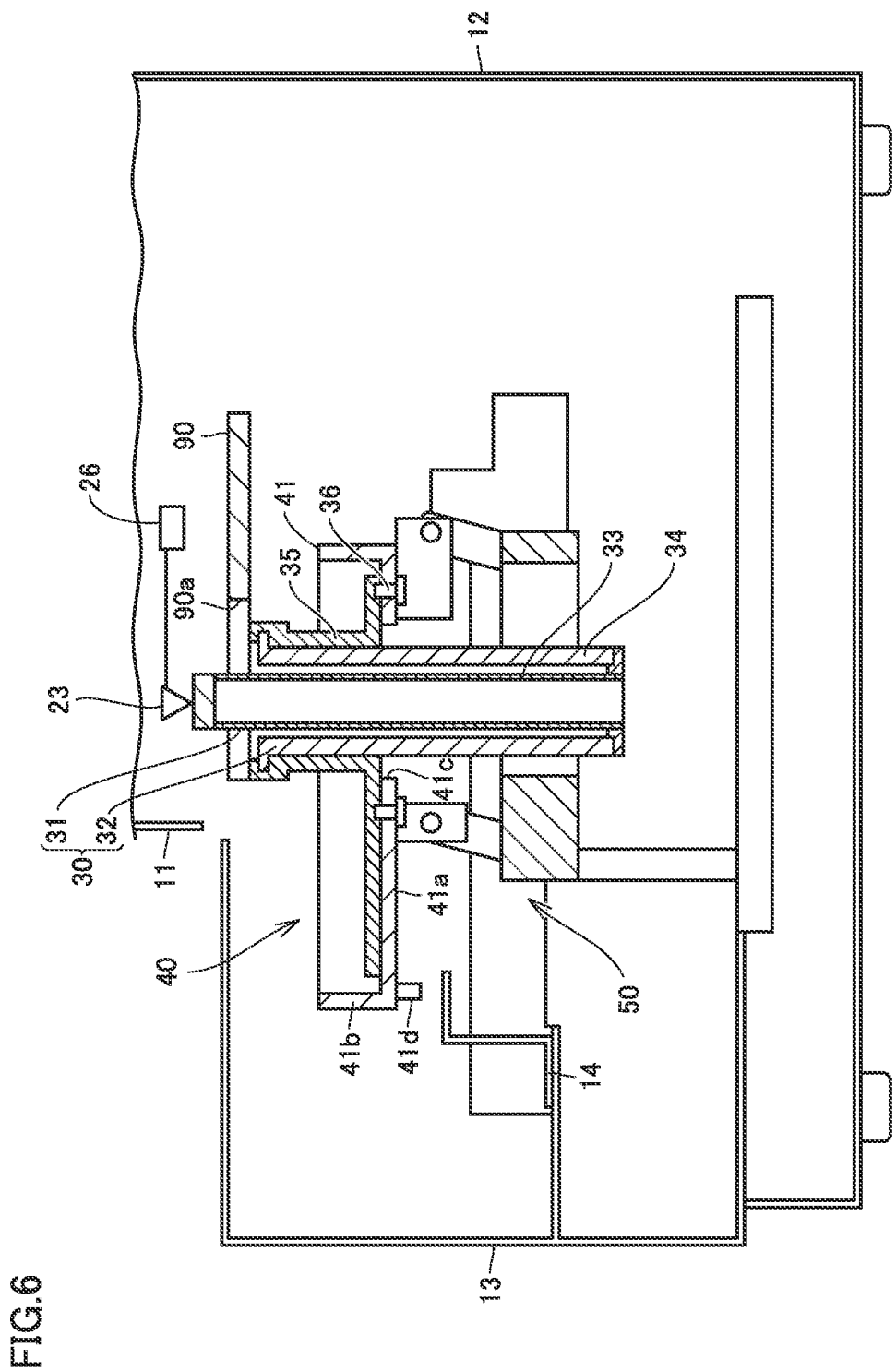
FIG. 6 is a schematic cross-sectional view showing a state in which a sample table 30 is located at a measurement position in measuring device 1 of the scanning probe microscope according to the embodiment.
Figure 7:
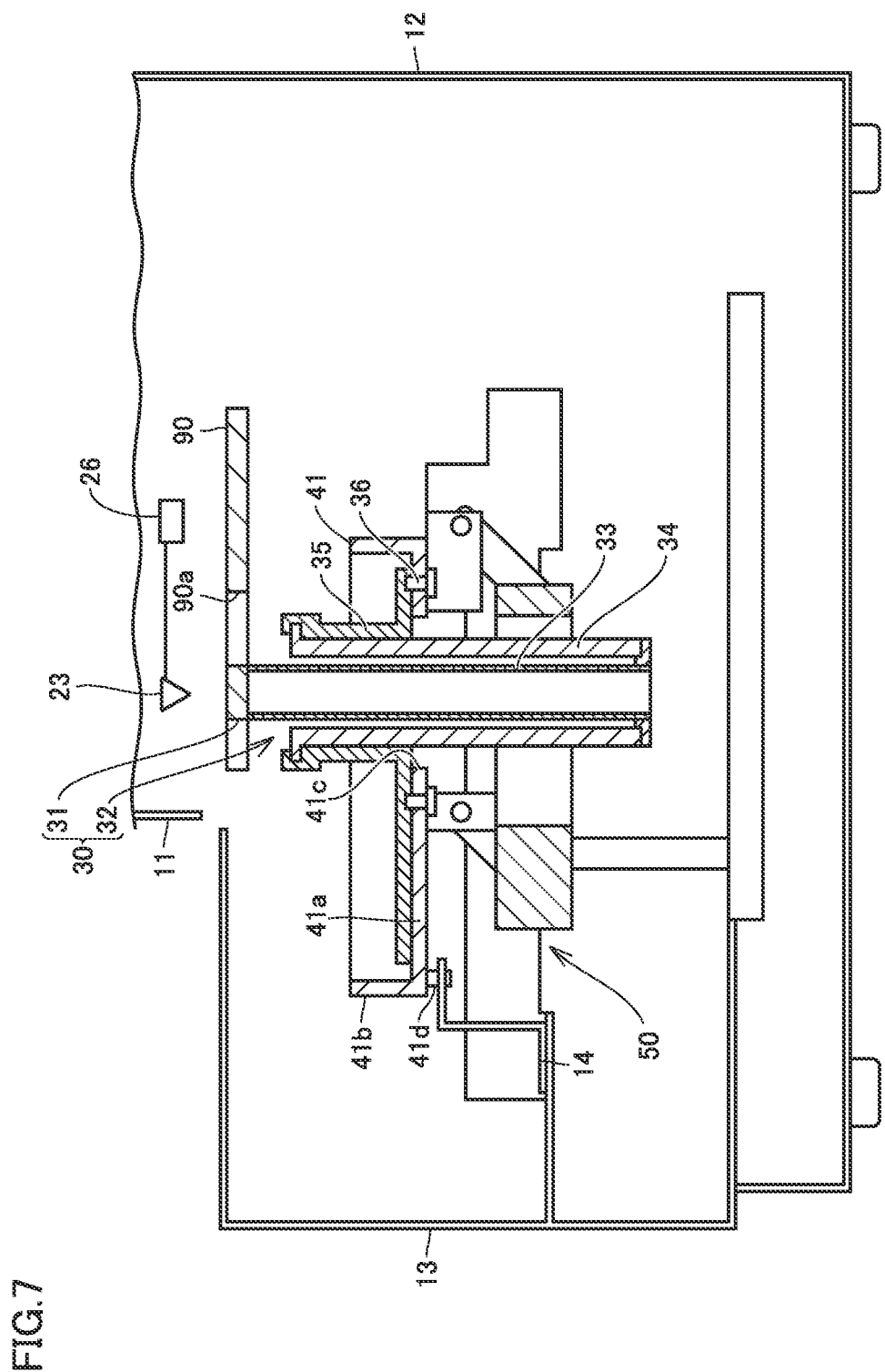
FIG. 7 is a schematic cross-sectional view showing a state in which sample table 30 is located at a retracted position in measuring device 1 of the scanning probe microscope according to the embodiment.
Figure 8:
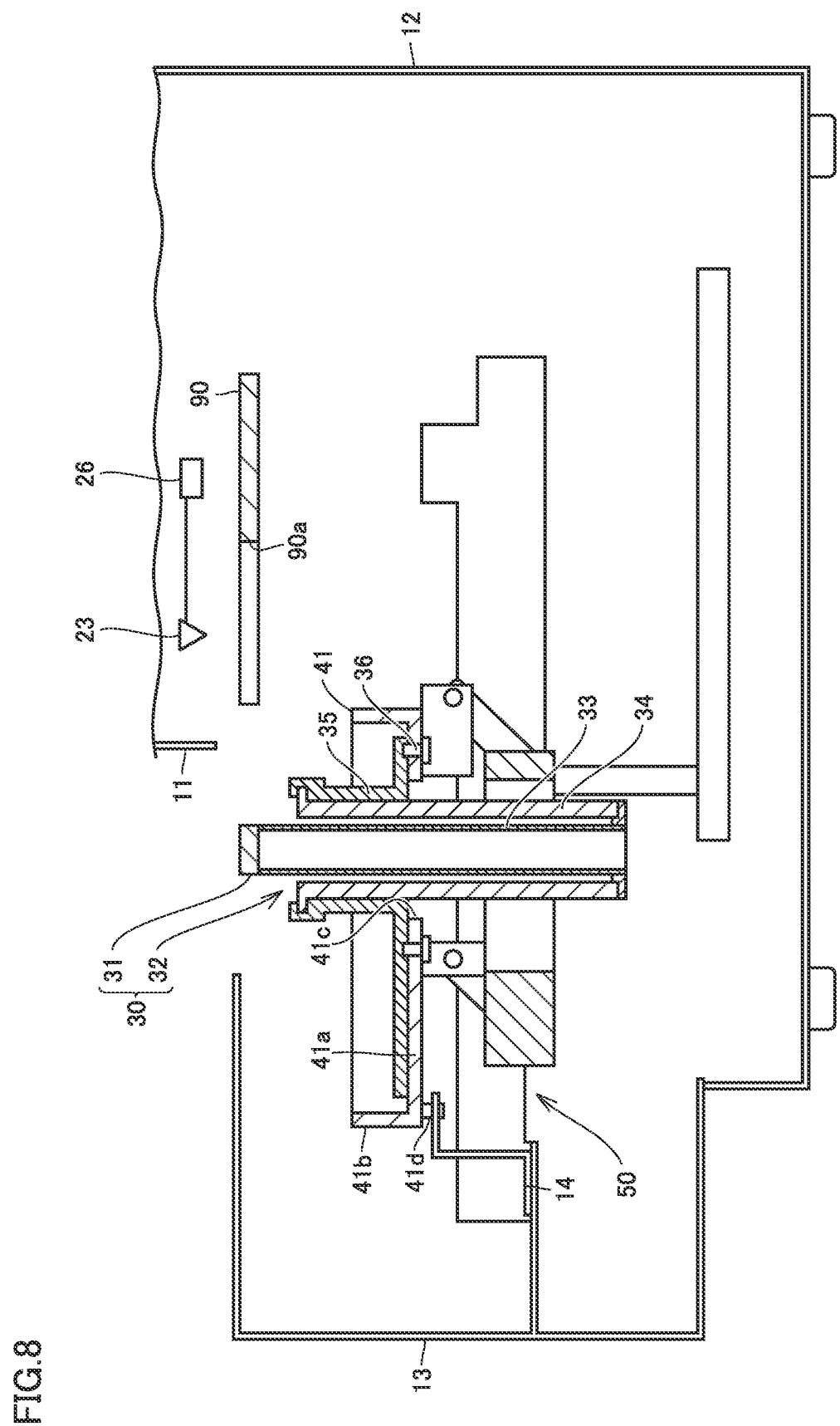
FIG. 8 is a schematic cross-sectional view showing a state in which sample table 30 is located at a sample take-out and scanner replacement position in measuring device 1 of the scanning probe microscope according to the embodiment.

FIG. 6 is a schematic cross-sectional view showing a state in which the sample table is located at the measurement position in measuring device 1 of the scanning probe microscope according to the embodiment. FIG. 7 is a schematic cross-sectional view showing a state in which the sample table is located at the retracted position in measuring device 1 of the scanning probe microscope according to the embodiment. FIG. 8 is a schematic cross-sectional view showing a state in which the sample table is located at the sample take-out and scanner replacement position in measuring device 1 of the scanning probe microscope according to the embodiment. A detailed configuration of sample table 30 and sample table holding unit 40 and an operation for taking out sample table 30 will be described with reference to FIGS. 6 to 8.

As shown in FIGS. 5A and 5B to FIG. 8, sample table holding unit 40 has a substantially box shape that is open upward. Sample table holding unit 40 includes a main body unit 41, and a plurality of leg units 42 and 43 described below (see FIG. 9). Main body unit 41 has a bottom unit 41a, a side wall unit 41b, a through hole 41c, and an engagement unit 41d.

Bottom unit 41a has a flat-plate shape. Side wall unit 41b is provided to rise from a perimeter edge of bottom unit 41a.

Through hole 41c is provided in a substantially central portion of bottom unit 41a. Sample table 30 is inserted into through hole 41c. Engagement unit 41d is provided in a front part of bottom unit 41a to protrude downward. Engagement unit 41d is a portion that detachably engages with a part of the housing. Specifically, engagement unit 41d is provided to be engageable with an overhang unit 14 provided in the housing.

Sample table 30 includes a sample placement unit 31 and scanner 32. Sample placement unit 31 is fixed to an upper end of scanner 32. Scanner 32 includes a piezo tube 33 and a scanner housing 34. Scanner housing 34 is fixed to sample table holding unit 40 by a bracket 35 and sample table 30 is thereby held by sample table holding unit 40. Bracket 35 is fixed to bottom unit 41a of sample table holding unit 40 by a fastening member 36 such as a screw.

As shown in FIG. 6, when sample table 30 is located at the measurement position, sample table 30, sample table holding unit 40 and movement mechanism 50 are housed in housing 10. In this state, an upper part of sample table 30 protrudes above plate unit 90. In addition, engagement unit 41d of sample table holding unit 40 is arranged to face overhang unit 14 and is in a disengaged state where engagement unit 41d does not engage with overhang unit 14.

When the sample is replaced or scanner 32 is replaced from the above-described state, sample table holding unit 40 is first moved down by movement mechanism 50 such that sample table 30 is moved down from the measurement position to the retracted position.

As shown in FIG. 7, even when sample table 30 is located at the retracted position, sample table 30, sample table holding unit 40 and movement mechanism 50 are housed in housing 10. In this state, however, the upper part of sample table 30 does not protrude above plate unit 90 when sample table 30 and sample table holding unit 40 are moved down. That is, an upper end of sample table 30 is located below measuring unit 20 and upper housing 11 when sample table 30 and sample table holding unit 40 are moved down. In addition, engagement unit 41d is in an engaged state where engagement unit 41d engages with an engagement hole provided in overhang unit 14.

Next, sample table holding unit 40 is slid frontward by movement mechanism 50 such that sample table 30 moves from the retracted position to the sample take-out and scanner replacement position. At this time, sample table 30 moves, with sample table 30 located below measuring unit 20, and thus, interference between measuring unit 20 and sample table 30 can be prevented. In addition, engagement unit 41d is in the engaged state, and thus, front unit 13 also slides frontward together with sample table holding unit 40.

As shown in FIG. 8, when sample table 30 is located at the sample take-out and scanner replacement position, frontward movement of front unit 13 causes sample table 30 to be exposed from a gap formed between upper housing 11 and front unit 13. This can facilitate replacement of the sample or replacement of scanner 32.

When measurement is performed after replacement of the sample or the scanner, the reverse operation is performed, and thus, sample table 30 can be moved from the sample take-out and scanner replacement position to the measurement position.

Figure 9:
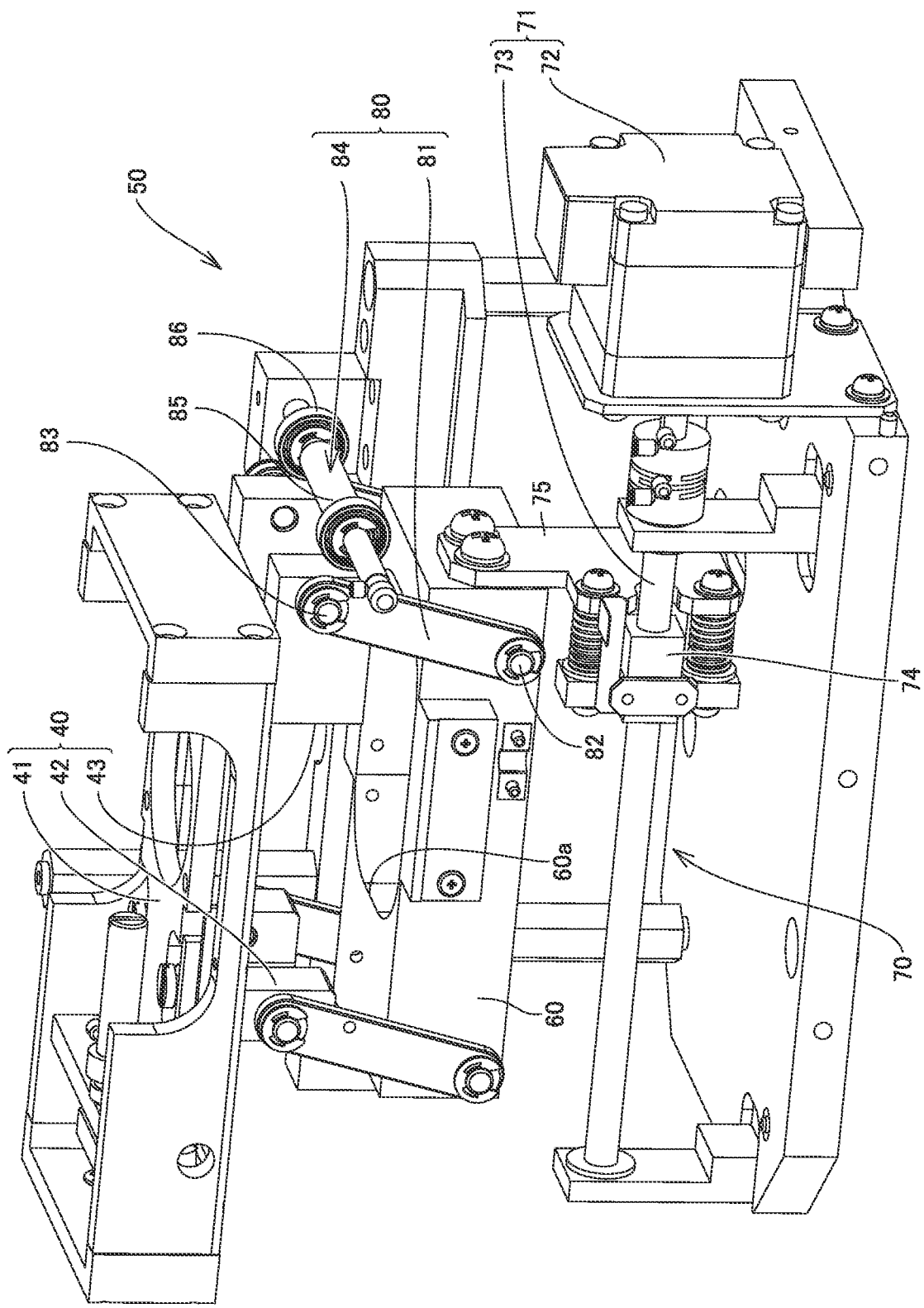
FIG. 9 is a perspective view showing a sample table holding unit and a part of a movement mechanism according to the embodiment.

FIG. 9 is a perspective view showing the sample table holding unit and a part of the movement mechanism according to the embodiment. A detailed configuration of movement mechanism 50 according to the embodiment will be described with reference to FIG. 9.

As shown in FIG. 9, movement mechanism 50 includes a support 60, a sliding mechanism 70 and a moving up and down mechanism 80.

Support 60 supports sample table holding unit 40. Support 60 is arranged below sample table holding unit 40. Support 60 has a substantially rectangular parallelepiped shape. A through hole 60a through which sample table holding unit 40 passes is provided in a central portion of support 60.

Sliding mechanism 70 moves support 60 along a sliding direction (front and back direction) in which sample table holding unit 40 slides. Sliding mechanism 70 includes a driving mechanism 71, a movable member 74 and a fixed unit 75.

Driving mechanism 71 has a motor 72 and a rotation shaft 73. Motor 72 is driven and rotation shaft 73 thereby rotates. A ball screw can, for example, be used as rotation shaft 73.

When rotation shaft 73 rotates, movable member 74 moves along a rotation axis direction of rotation shaft 73. A rotation axis of rotation shaft 73 is arranged in parallel with the front and back direction. When rotation shaft 73 rotates forward, movable member 74 moves frontward. When rotation shaft 73 rotates reversely, movable member 74 moves backward.

Fixed unit 75 fixes movable member 74 to support 60. Thus, when movable member 74 moves, support 60 also moves together with movable member 74.

Moving up and down mechanism 80 moves up and down sample table holding unit 40 with respect to support 60. Moving up and down mechanism 80 includes a coupling member 81 and a moving up and down guide 84.

Coupling member 81 couples support 60 to sample table holding unit 40. Four coupling members 81 are provided. Two coupling members 81 are coupled to right and left side surfaces in a front part of support 60, and two coupling members 81 are coupled to right and left side surfaces in a back part of support 60.

One end side of coupling member 81 is pivotally supported by support 60 such that coupling member 81 is pivotable about a first pivot shaft 82. First pivot shaft 82 is orthogonal to the above-described sliding direction (front and back direction) and the above-described moving up and down direction (up and down direction). That is, first pivot shaft 82 is parallel to a right and left direction.

The other end side of coupling member 81 is pivotally supported by sample table holding unit 40 such that coupling member 81 is pivotable about a second pivot shaft 83. Second pivot shaft 83 is parallel to first pivot shaft 82. Second pivot shaft 83 is located behind and above first pivot shaft 82.

Moving up and down guide 84 guides movement of sample table holding unit 40 in the moving up and down direction. Moving up and down guide 84 also restricts movement of sample table holding unit 40 in a backward direction (backward) from the sample take-out and scanner replacement position toward the retracted position while sample table holding unit 40 is being moved up and down.

Moving up and down guide 84 includes a rotation shaft 85 and a roller 86. Rotation shaft 85 is parallel to first pivot shaft 82. Rotation shaft 85 is located behind second pivot shaft 83. Roller 86 is provided to be rotatable about second pivot shaft 83. Rotation shaft 85 is fixed to be non-slidable in the sliding direction.

Sample table holding unit 40 includes main body unit 41 and the plurality of leg units 42 and 43. The plurality of leg units 42 and 43 are provided to protrude downward from main body unit 41. The plurality of leg units 42 are provided on the front side and the plurality of leg units 43 are provided on the back side.

Figure 11:
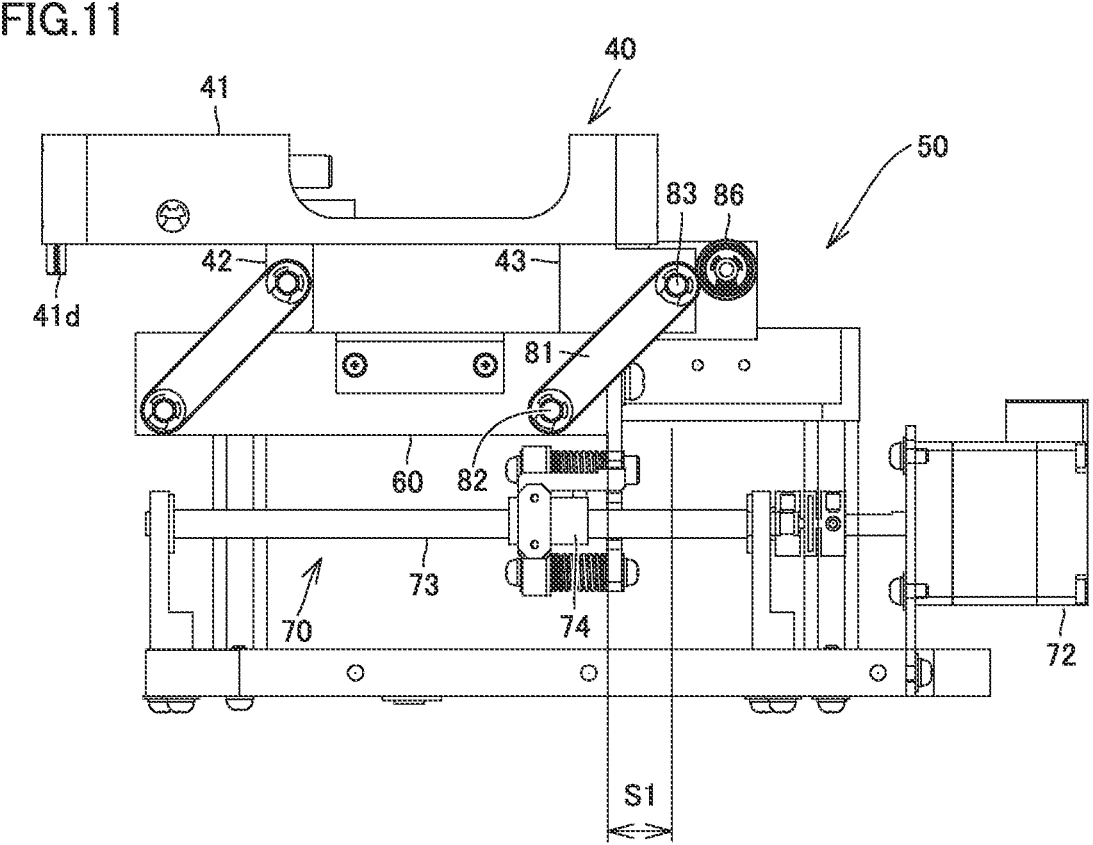
FIG. 11 is a plan view showing the sample table holding unit and a part of the movement mechanism in the state where sample table 30 is located at the retracted position.
Figure 12:
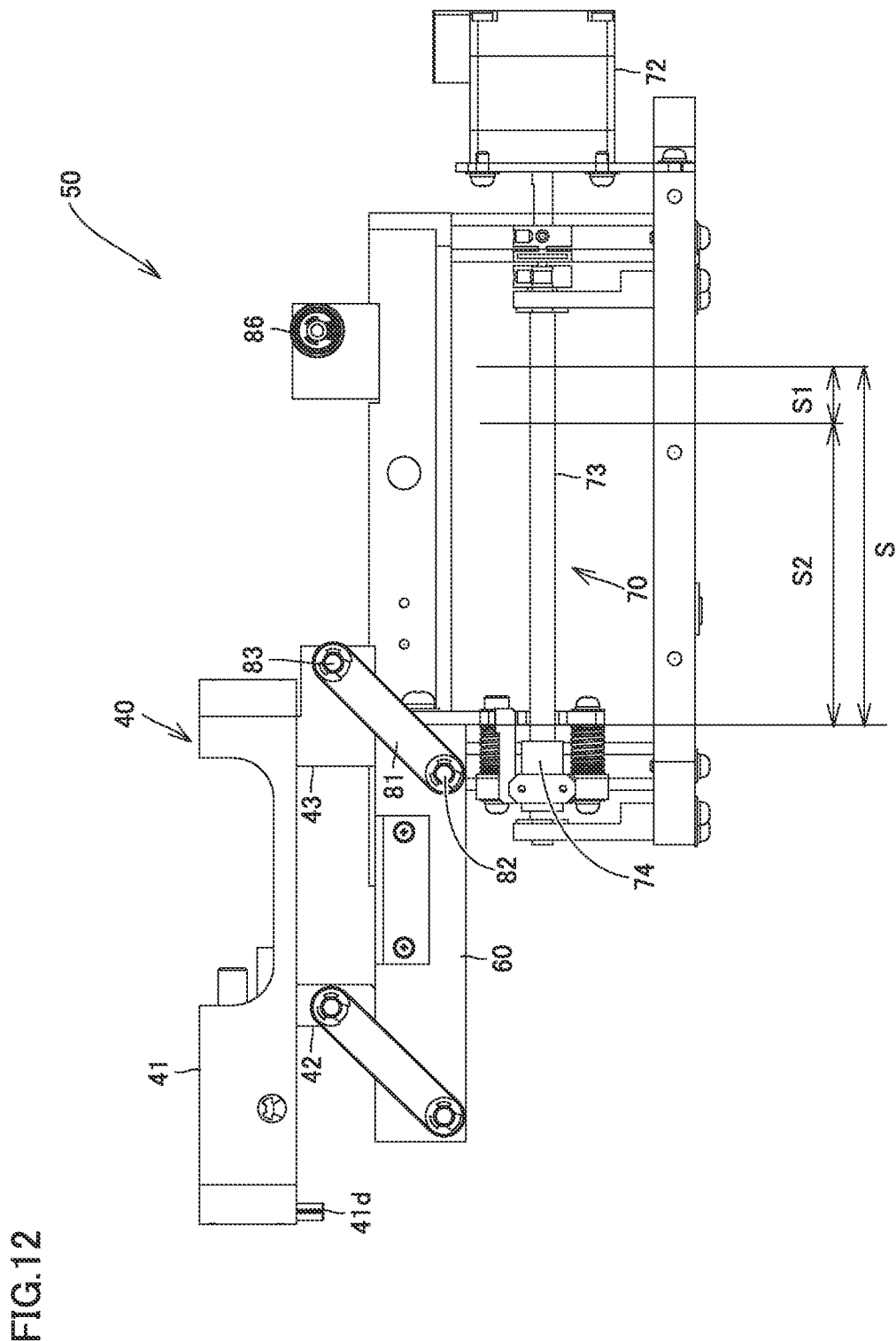
FIG. 12 is a plan view showing the sample table holding unit and a part of the movement mechanism in the state where sample table 30 is located at the sample take-out and scanner replacement position.

Movement mechanism 50 configured as described above is provided such that support 60 is movable in a prescribed slide section S (see FIG. 12) including continuous first and second sections S1 (see FIG. 11) and S2 (see FIG. 12). With movement of support 60 in first section S1, sample table holding unit 40 is moved up and down by moving up and down mechanism 80. With movement of support 60 in second section S2, sample table holding unit 40 slides along the sliding direction together with support 60.

Thus, switching between the moving up and down movement and the sliding movement of sample table holding unit 40 can be performed in accordance with the slide section of support 60. By continuously sliding support 60 in prescribed slide section S, sample table holding unit 40 can be appropriately moved, and thus, operation control can be easily performed.

The movement of support 60 and the movement of sample table holding unit 40 will be described below with reference to FIGS. 10 to 12.

Figure 10:
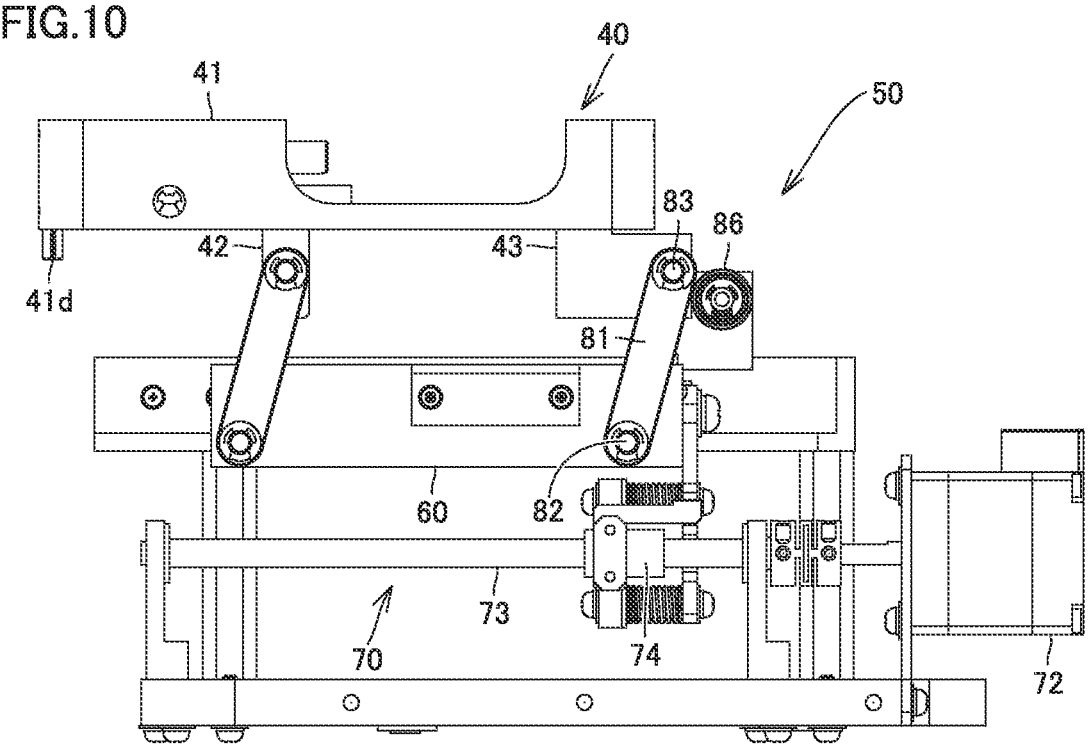
FIG. 10 is a plan view showing the sample table holding unit and a part of the movement mechanism in the state where sample table 30 is located at the measurement position.

FIG. 10 is a plan view showing the sample table holding unit and a part of the movement mechanism in the state where sample table 30 is located at the measurement position. As shown in FIG. 10, in this state, an inclination angle (a smaller one of the angles formed by a direction of extension of coupling member 81 and the sliding direction) of coupling member 81 is large and the plurality of leg units 42 and 43 are spaced apart from support 60.

In addition, back surfaces of the plurality of leg units 43 abut against roller 86 to thereby restrict the backward movement of sample table holding unit 40.

When support 60 is moved frontward from this state, the one end side of coupling member 81 moves frontward, with the backward movement of coupling member 81 restricted. As a result, coupling member 81 rotates about a first rotation axis and a second rotation axis such that the other end of coupling member 81 moves downward. That is, the above-described inclination angle of coupling member 81 becomes smaller. As a result, sample table holding unit 40 is moved down. When sample table holding unit 40 is moved down, roller 86 rotates and the move-down of sample table holding unit 40 is also guided. When sample table holding unit 40 is moved up, an operation opposite to the above-described operation is performed.

Sample table holding unit 40 is moved up and down, with coupling member 81 pivotally supported such that the posture (inclination angle) can be changed as described above, and thus, moving up and down mechanism 80 can be simplified. Furthermore, roller 86 rotates when sample table holding unit 40 is moved up and down, and thus, friction between moving up and down guide 84 and sample table holding unit 40 can be reduced.

FIG. 11 is a plan view showing the sample table holding unit and a part of the movement mechanism in the state where sample table 30 is located at the retracted position. As shown in FIG. 11, when support 60 is moved by first section S1 from the state shown in FIG. 10, sample table holding unit 40 is moved down and thus the plurality of leg units 42 and 43 abut against support 60. As a result, the move-down of sample table holding unit 40 is restricted and sample table 30 enters the retracted position. In this state, the posture (inclination angle) of coupling member 81 is maintained constant.

As described above, support 60 functions as restricting means for restricting the move-down of sample table holding unit 40. The move-up of sample table holding unit 40 is restricted when sample table holding unit 40 abuts against plate unit 90 arranged above sample table holding unit 40. Since plate unit 90 and support 60 function as the restricting means as described above, the number of components can be reduced and the range of moving up and down sample table holding unit 40 can be restricted with a simple configuration.

When support 60 is slid further frontward from the state shown in FIG. 11, sample table holding unit 40 slides frontward together with support 60, with a height position maintained constant. At this time, sample table 30 also slides frontward together with sample table holding unit 40.

FIG. 12 is a plan view showing the sample table holding unit and a part of the movement mechanism in the state where sample table 30 is located at the sample take-out and scanner replacement position. As shown in FIG. 12, when support 60 is moved by second section S2 from the state shown in FIG. 11, sample table 30 fixed to sample table holding unit 40 moves to the sample take-out and scanner replacement position.

Figure 13:
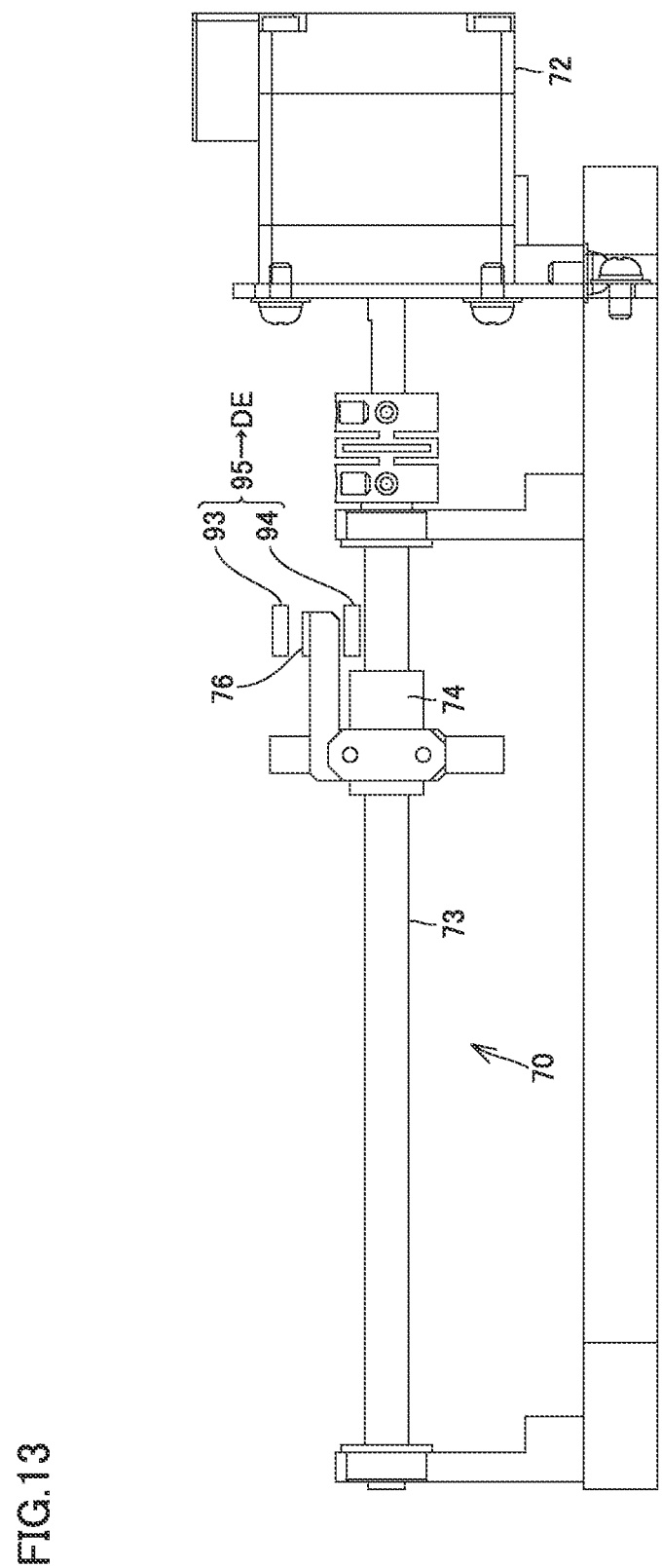
FIG. 13 is a diagram for illustrating a detector according to the embodiment.

FIG. 13 is a diagram for illustrating a detector according to the embodiment. A detector 95 according to the embodiment will be described with reference to FIG. 13.

As shown in FIG. 13, measuring device 1 of the scanning probe microscope includes detector 95. Detector 95 detects a position of support 60. Specifically, detector 95 detects the position of support 60 in the front and back direction to thereby detect whether or not sample table 30 fixed to sample table holding unit 40 is located at the sample take-out and scanner replacement position.

Detector 95 includes a light emitting unit 93, and a light receiving unit 94 that receives light emitted from light emitting unit 93. Light emitting unit 93 and light receiving unit 94 are arranged to face each other in the up and down direction. Sliding mechanism 70 includes a light blocking member 76 that slides with the slide movement of support 60.

Detector 95 detects the position of support 60 when the light emitted from light emitting unit 93 toward light receiving unit 94 is blocked by light blocking member 76. Light blocking member 76 is provided to block the above-described light when sample table 30 fixed to sample table holding unit 40 is located at the sample take-out and scanner replacement position. Detector 95 outputs a detection signal DE when sample table 30 fixed to sample table holding unit 40 is located at the sample take-out and scanner replacement position. Based on detection signal DE, a controller 201 controls the slide movement of sample table 30 in the front and back direction (direction of arrow DR2).

Figure 14:
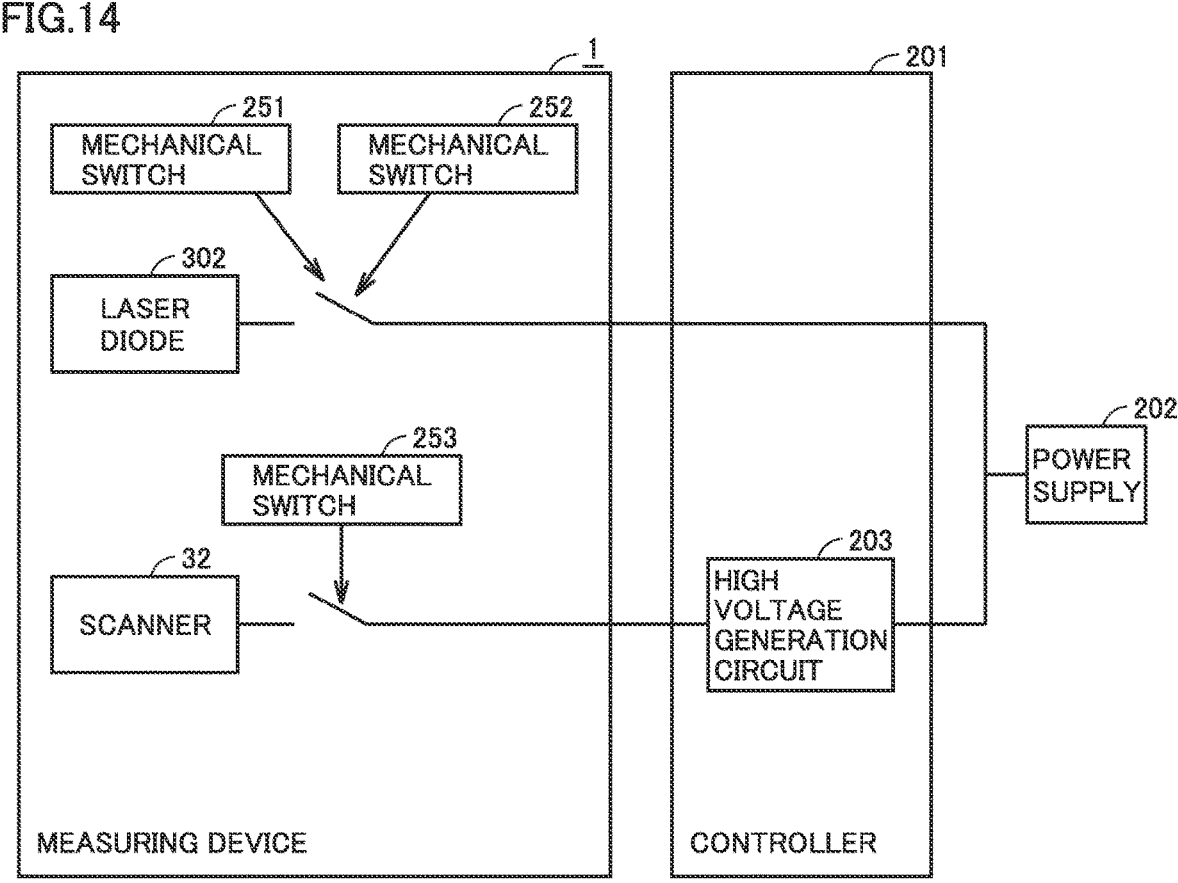
FIG. 14 is a diagram for illustrating the operations of mechanical switches 251, 252 and 253.

FIG. 14 is a diagram for illustrating the operations of mechanical switches 251, 252 and 253.

Controller 201 includes a high voltage generation circuit 203.

When cover 19 is closed, mechanical switch 251 is pressed. When cover 19 is opened, mechanical switch 251 is not pressed.

When mechanical switch 251 is pressed, mechanical switch 251 electrically connects a power supply 202 and a laser diode 302. When mechanical switch 251 is not pressed, mechanical switch 251 electrically disconnects power supply 202 and laser diode 302.

When sample table 30 is moved to the measurement position by driving mechanism 45, mechanical switch 252 and mechanical switch 253 are pressed by protrusion 256 of top plate 255. When sample table 30 is moved to the sample take-out and scanner replacement position by driving mechanism 45, mechanical switch 252 and mechanical switch 253 are not pressed by protrusion 256 of top plate 255.

When mechanical switch 252 is pressed by protrusion 256, mechanical switch 252 electrically connects power supply 202 and laser diode 302. When mechanical switch 252 is not pressed by protrusion 256, mechanical switch 252 electrically disconnects power supply 202 and laser diode 302.

High voltage generation circuit 203 generates a high voltage to be supplied to scanner 32, using a voltage supplied from power supply 202.

When mechanical switch 253 is pressed by protrusion 256, mechanical switch 253 electrically connects scanner 32 and high voltage generation circuit 203. When mechanical switch 253 is not pressed by protrusion 256, mechanical switch 253 electrically disconnects scanner 32 and high voltage generation circuit 203. Laser diode 302 emits a laser beam when laser diode 302 is electrically connected to power supply 202. Laser diode 302 does not emit a laser beam when laser diode 302 is electrically disconnected from power supply 202.

As shown in FIGS. 1 to 3, mechanical switch 251 is provided at a location that is not visible to the user. This prevents erroneous detection of opening and closing of cover 19.

An analyzing unit 206 measures a property of the sample based on a displacement of cantilever 23 obtained from a change in position of the laser beam detected by the displacement detection system. For example, analyzing unit 206 creates a force curve or the like indicating a time change in action force (force), based on a time change in displacement of cantilever 23.

Figure 15:
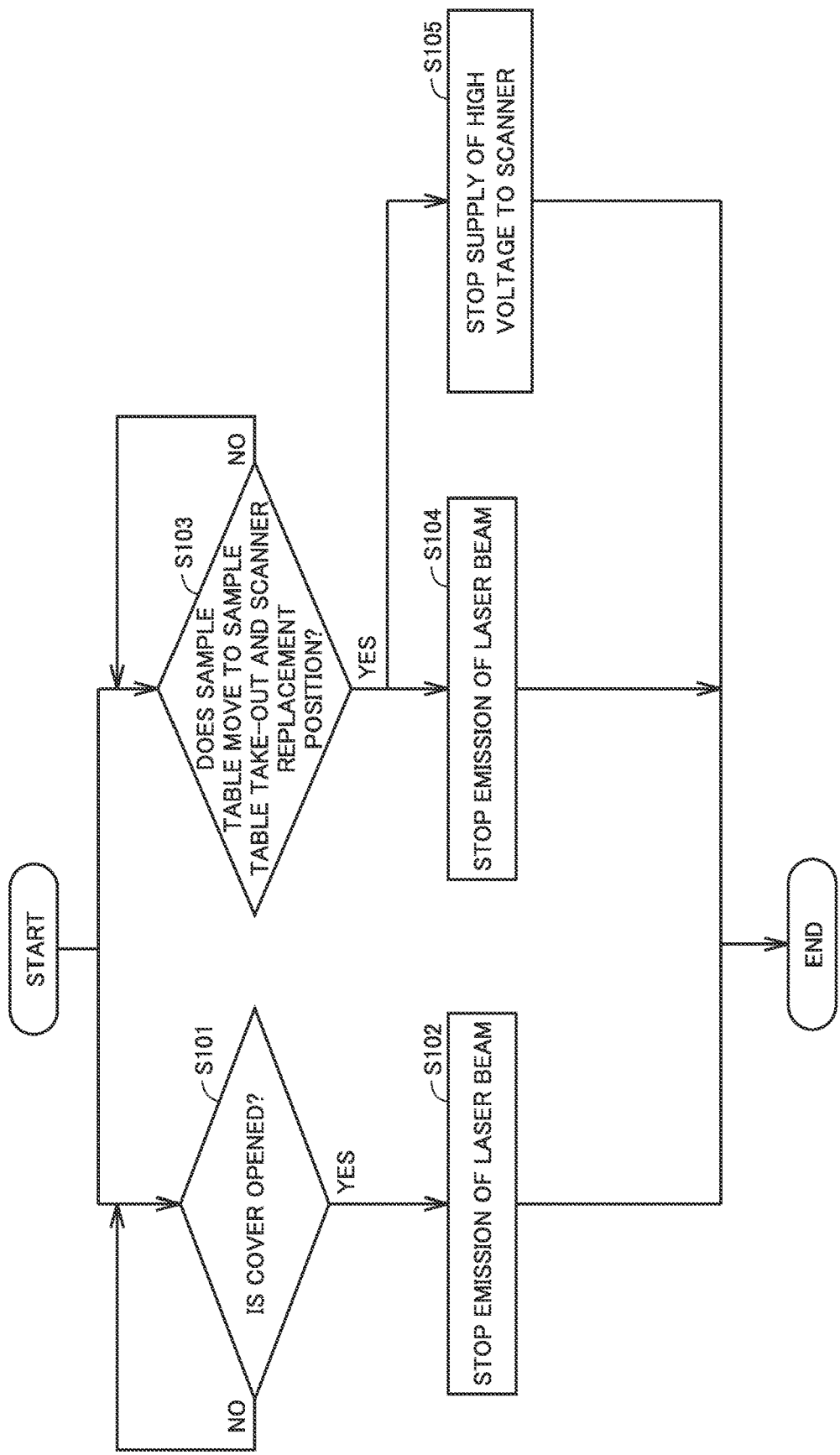
FIG. 15 is a flowchart showing a procedure of transition from the time of measurement in the scanning probe microscope according to the embodiment.

FIG. 15 is a flowchart showing a procedure of transition from the time of measurement in the scanning probe microscope according to the embodiment.

Since cover 19 is closed at the time of measurement, mechanical switch 251 is pressed. In addition, since sample table 30 is located at the measurement position, mechanical switch 252 and mechanical switch 253 are pressed. As a result, power supply 202 and laser diode 302 are electrically connected, and thus, a laser beam is emitted. Power supply 202 and high voltage generation circuit 203 are electrically connected, and thus, a high voltage is supplied to scanner 32.

When cover 19 is opened in step S101, the process proceeds to step S102.

In step S102, pressed mechanical switch 251 is released. As a result, power supply 202 and laser diode 302 are electrically disconnected, and thus, the emission of the laser beam is stopped.

When sample table 30 moves to the sample take-out and scanner replacement position in step S103, the process proceeds to steps S104 and S105.

In step S104, pressed mechanical switch 252 is released. As a result, power supply 202 and laser diode 302 are electrically disconnected, and thus, the emission of the laser beam is stopped.

In step S105, pressed mechanical switch 253 is released. As a result, power supply 202 and high voltage generation circuit 203 are electrically disconnected, and thus, the supply of the high voltage to scanner 32 is stopped.

First Modification

Figure 16:
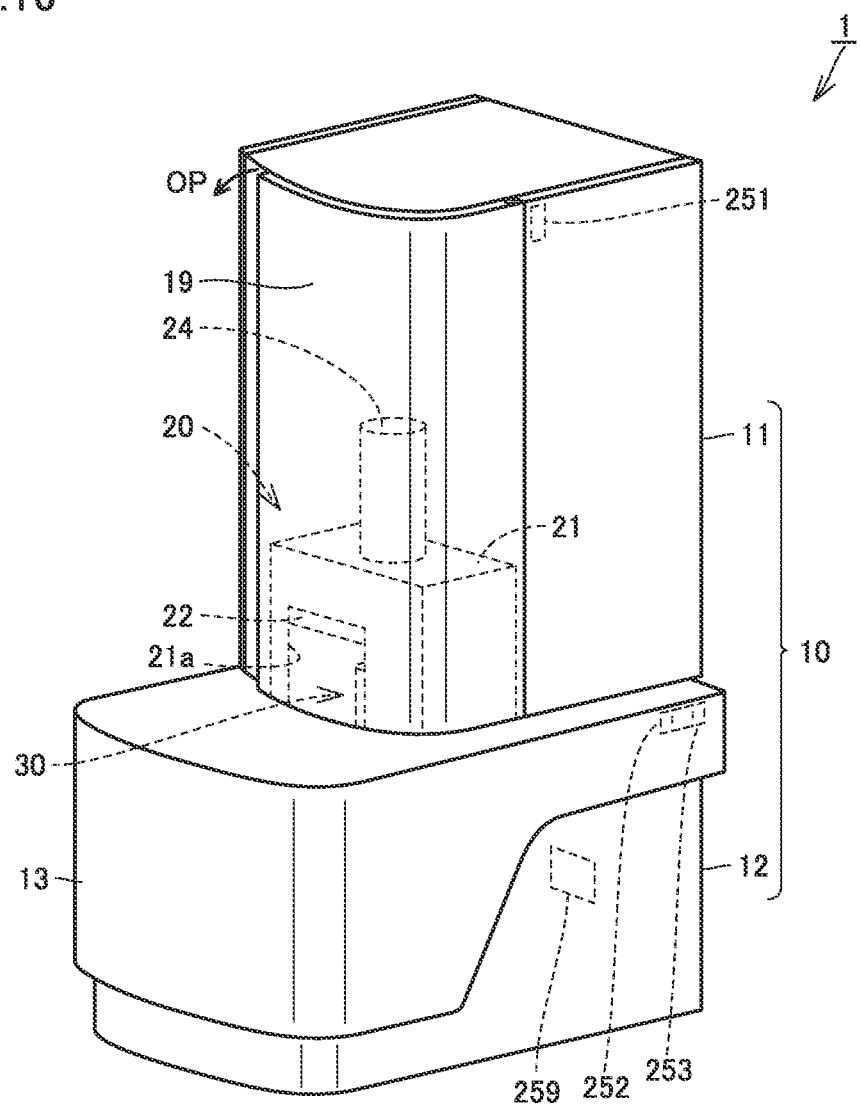
FIG. 16 is a perspective view showing a state of a measuring device 1 of a scanning probe microscope according to a first modification at the time of measurement.

FIG. 16 is a perspective view showing a state of a measuring device 1 of a scanning probe microscope according to a first modification at the time of measurement.

In the first modification, a mechanical switch 259 is provided on a back surface in lower housing 12. When sample table 30 is located at the measurement position, mechanical switch 259 is pressed by sliding mechanism 70. When sample table 30 is located at the sample take-out and scanner replacement position, mechanical switch 259 is not pressed by sliding mechanism 70. When mechanical switch 259 is pressed, mechanical switch 259 electrically connects power supply 202 and high voltage generation circuit 203. When mechanical switch 259 is not pressed, mechanical switch 259 electrically disconnects power supply 202 and high voltage generation circuit 203.

Second Modification

The foregoing embodiment has been described in connection with the case of relatively displacing measuring unit 20 and sample table 30 by fixing the position of measuring unit 20 and moving the position of sample table 30. However, the present invention is not limited thereto.

Measuring unit 20 may be movable between the measurement position and the sample take-out and scanner replacement position. In this case, when measuring unit 20 is located at the measurement position, the relative positional relationship between measuring unit 20 and sample table 30 is the first positional relationship. When measuring unit 20 is located at the sample take-out and scanner replacement position, the relative positional relationship between measuring unit 20 and sample table 30 is the second positional relationship.

Third Modification

Figure 17A:
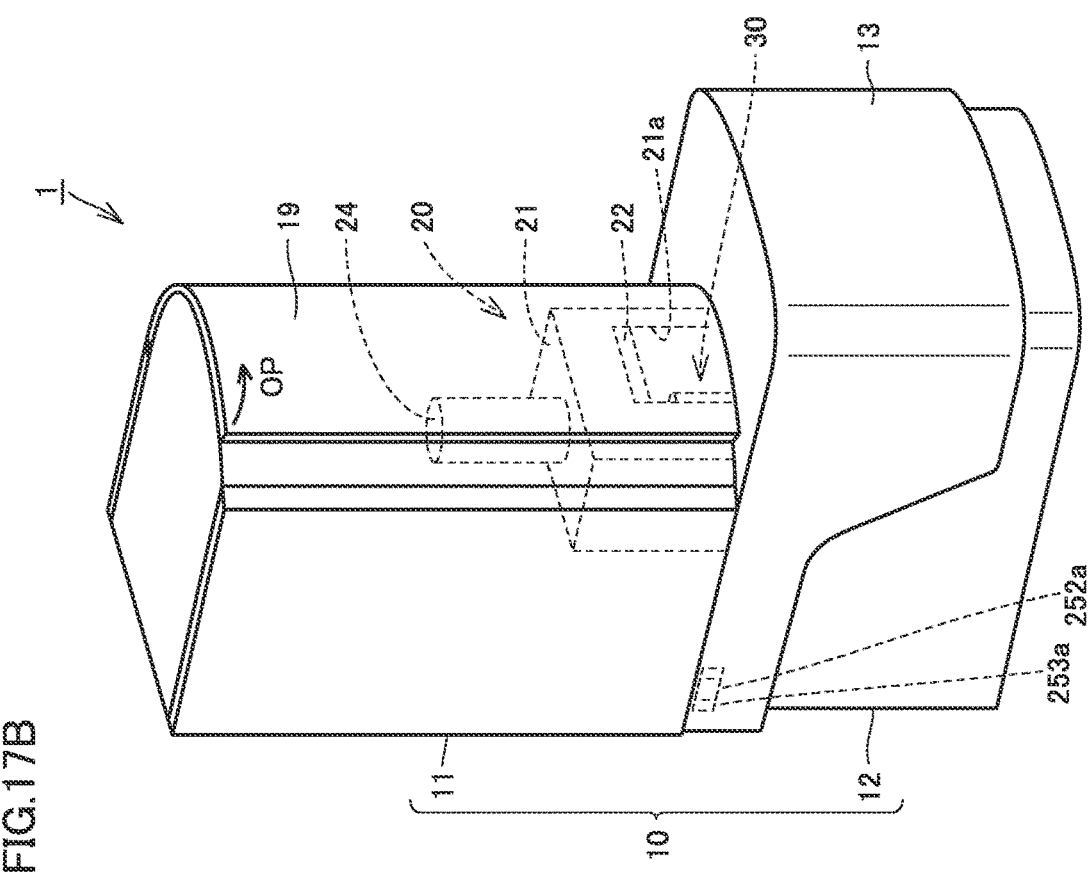
FIGS. 17A and 17B are perspective views showing a state of a measuring device 1 of a scanning probe microscope according to a third modification at the time of measurement.
Figure 17B:
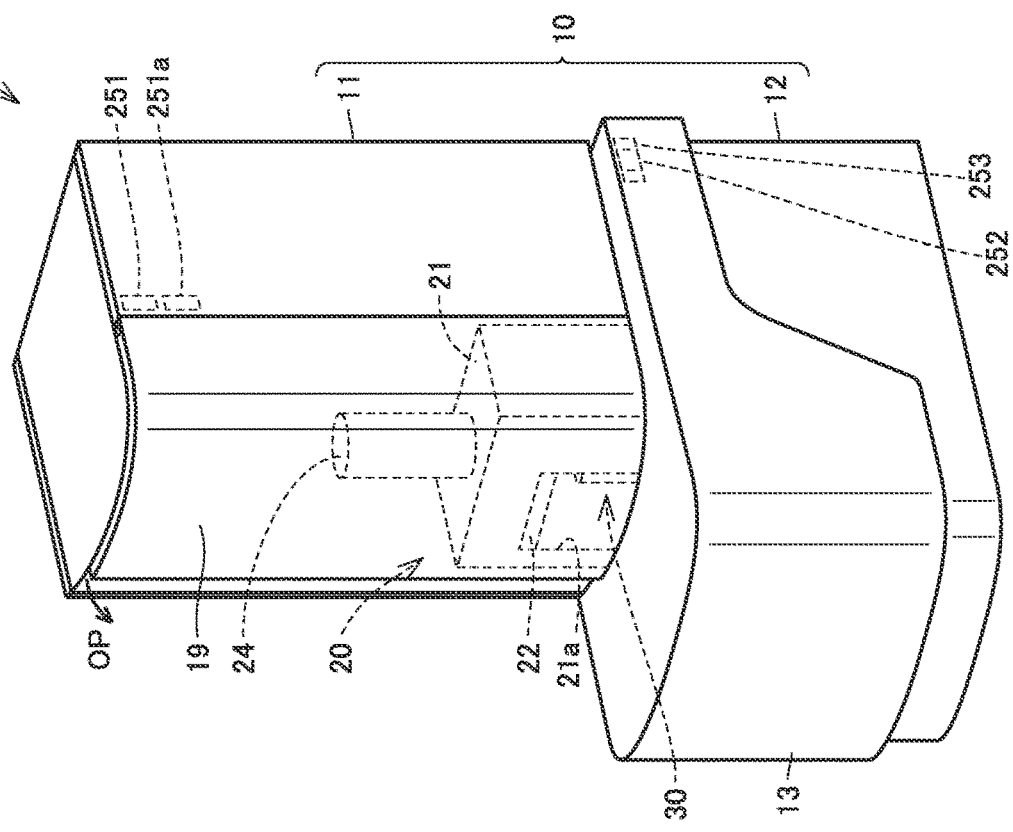

FIGS. 17A and 17B are perspective views showing a state of a measuring device 1 of a scanning probe microscope according to a third modification at the time of measurement.

In preparation for breakage of mechanical switches 251, 252 and 253 serving as safety mechanisms, measuring device 1 of the scanning probe microscope according to the third modification further includes a mechanical switch 251a, a mechanical switch 252a and a mechanical switch 253a.

Similarly to mechanical switch 251, mechanical switch 251a is provided on the inside of cover 19 and detects opening and closing of cover 19 of upper housing 11.

Mechanical switch 252a is provided on the inside of lower housing 12 and at a position that faces the position at which mechanical switch 252 is provided. Mechanical switch 253a is provided on the inside of lower housing 12 and at a position that faces the position at which mechanical switch 253 is provided. When sample table 30 moves to the measurement position by driving mechanism 45, mechanical switch 252a and mechanical switch 253a are pressed by a protrusion 256a (not shown) of top plate 255.

When mechanical switch 251a is pressed, mechanical switch 251a electrically connects power supply 202 and laser diode 302. When mechanical switch 251a is not pressed, mechanical switch 251a electrically disconnects power supply 202 and laser diode 302.

When mechanical switch 252a is pressed by protrusion 256a, mechanical switch 252a electrically connects power supply 202 and laser diode 302. When mechanical switch 252a is not pressed by protrusion 256a, mechanical switch 252a electrically disconnects power supply 202 and laser diode 302.

When mechanical switch 253a is pressed by protrusion 256a, mechanical switch 253a electrically connects scanner 32 and high voltage generation circuit 203. When mechanical switch 253a is not pressed by protrusion 256a, mechanical switch 253a electrically disconnects scanner 32 and high voltage generation circuit 203.

[Additional Remarks]

The surface analyzer according to the present disclosure includes the features described below.

(1) A surface analyzer (1) includes: a sample table (30) on which a sample is placed; a sample table holding unit (40) that holds the sample table (30); a measuring unit (20) including a cantilever (23) arranged to face the sample table (30) and a cantilever driving unit (26) that drives the cantilever (23); a driving mechanism (45) that relatively displaces the measuring unit (20) and the sample table (30) such that a relative positional relationship between the measuring unit (20) and the sample table (30) is switched between a first positional relationship and a second positional relationship; a controller (201); and a first mechanical switch (253). The sample table (30) includes a scanner (32) and a sample placement unit (31). The measuring unit (20) is housed in an upper housing (11). In the first positional relationship, the sample table (30) is housed in a lower housing (12). In the second positional relationship, the sample table (30) is exposed to the outside from within the lower housing (12). The controller (201) includes a high voltage generation circuit (203) that is connected to a power supply (202) and generates a high voltage to be supplied to the scanner (32). The first mechanical switch (253) causes the power supply (202) to supply a voltage to the high voltage generation circuit (203) in the first positional relationship, and causes the power supply (202) not to supply the voltage to the high voltage generation circuit (203) in the second positional relationship.

With such a configuration, it is possible to prevent the high voltage from being applied to the scanner (32) when the relative positional relationship between the measuring unit (20) and the sample table (30) is the second positional relationship.

(2) Preferably, when the sample table (30) is taken out, the driving mechanism (45) changes the positional relationship between the sample table (30) and the measuring unit (20) from the first positional relationship to the second positional relationship, by relatively displacing the sample table (30) with respect to the measuring unit (20) such that the measuring unit (20) and the sample table (30) move away from each other in a first direction in which the cantilever (23) and the sample table (30) face each other, and then, sliding the sample table (30) in a second direction intersecting the first direction.

With such a configuration, when the sample table slides, the sample table moves, with the sample table spaced apart from the measuring unit, and thus, interference between the measuring unit and the sample table can be prevented. In addition, without waiting for movement of the cantilever by the cantilever driving unit in the measuring unit, the sample table can be taken out by relatively displacing the measuring unit and the sample table as described above. Therefore, it does not take time and effort to take out the sample table, and the sample table can be easily taken out.

(3) Preferably, the driving mechanism (45) includes a sample table holding unit (40) that holds the sample table (30), and a movement mechanism (50) that moves the sample table (30) between a measurement position and a sample take-out and scanner replacement position. The first direction is an up and down direction. The movement mechanism (50) moves up and down the sample table holding unit (40) such that the sample table (30) is moved up and down between the measurement position and a retracted position located below the measurement position, and slides the sample table holding unit (40) such that the sample table (30) is moved between the sample take-out and scanner replacement position and the retracted position.

With such a configuration, when the sample table is taken out, the sample table is retracted downward with respect to the measuring unit, and then, the sample table is slid. In contrast, when the sample table is set, the reverse operation is performed. Therefore, when the sample table slides, the sample table moves, with the sample table located below the measuring unit, and thus, interference between the measuring unit and the sample table can be prevented.

In addition, by moving the sample table holding unit without moving the measuring unit, the sample table can be moved between the measurement position and the sample take-out and scanner replacement position. Therefore, a variation in position of the measuring equipment included in the measuring unit can be reduced, as compared with a configuration in which the measuring unit is moved to take out the sample table and a configuration in which the measuring unit is removed to take out the sample table. Furthermore, the work for removing the measuring unit becomes unnecessary, and thus, the work load and the work time when the sample table is taken out can be reduced. In addition, the sample take-out and scanner replacement position is provided at the position that does not overlap with the measuring unit in the up and down direction, and thus, a sufficient work space can be ensured, which leads to improvement in workability.

(4) Preferably, when the movement mechanism (50) slides the sample table (30) in the second direction and the positional relationship between the sample table (30) and the measuring unit (20) becomes the first positional relationship, the first mechanical switch (253) is pressed to electrically connect the power supply (202) and the high voltage generation circuit (203).

With such a configuration, using the first mechanical switch (253), the movement of the sample table (30) can be detected and the supply of the voltage of the power supply (202) to the high voltage generation circuit (203) can be controlled.

(5) Preferably, the measuring unit (20) includes a laser diode (302). The surface analyzer (1) further includes a second mechanical switch (252) that causes the power supply (202) to supply the voltage to the laser diode (302) in the first positional relationship, and causes the power supply (202) not to supply the voltage to the laser diode (302) in the second positional relationship.

With such a configuration, it is possible to prevent the laser diode (302) from being maintained in a lighting state when the relative positional relationship between the measuring unit (20) and the sample table (30) is the second positional relationship.

(6) Preferably, when the movement mechanism (50) slides the sample table (30) in the second direction and the positional relationship between the sample table (30) and the measuring unit (20) becomes the first positional relationship, the second mechanical switch (252) is pressed to electrically connect the power supply (202) and the laser diode (302).

With such a configuration, using the second mechanical switch (252), the movement of the sample table (30) can be detected and the supply of the voltage of the power supply (202) to the laser diode (302) can be controlled.

(7) Preferably, the movement mechanism (50) includes a support (60) that supports the sample table holding unit (40), a sliding mechanism (70) that slides the support (60) along a sliding direction in which the sample table holding unit (40) slides, and a moving up and down mechanism (80) that moves up and down the sample table holding unit (40) with respect to the support (60). The support (60) is provided to be movable in a prescribed slide section including continuous first and second sections. With slide movement of the support (60) in the first section, the sample table holding unit (40) is moved up and down with respect to the support (60) by the moving up and down mechanism (80). With slide movement of the support (60) in the second section, the sample table holding unit (40) slides along the sliding direction together with the support (60). The surface analyzer (1) further includes a detector (95) that detects a position of the support (60). The detector (95) includes a light emitting unit (93) and a light receiving unit (94) that receives light emitted from the light emitting unit (93). The sliding mechanism (70) includes a light blocking member (76) that slides with the slide movement of the support (60). The detector (95) detects the position of the support (60) when the light emitted from the light emitting unit (93) toward the light receiving unit (94) is blocked by the light blocking member (76). The controller (201) controls slide movement of the sample table (30) based on the position of the support (60) detected by the detector (95).

With such a configuration, the mechanism (detector (95)) for detecting the position of the sample table (30) to control the slide movement of the sample table (30) can be separated from the mechanism (first mechanical switch (253) and second mechanical switch (252)) for detecting the position of the sample table (30) for safety. Even when the detector (95) fails, the first mechanical switch (253) and the second mechanical switch (252) operate, and thus, the safety measures are not damaged.

(8) A surface analyzer (1) includes: a sample table (30) on which a sample is placed; a sample table holding unit (40) that holds the sample table (30); a measuring unit (20) including a cantilever (23) arranged to face the sample table (30) and a cantilever driving unit (26) that drives the cantilever (23); a driving mechanism (45) that relatively displaces the measuring unit (20) and the sample table (30) such that a relative positional relationship between the measuring unit (20) and the sample table (30) is switched between a first positional relationship and a second positional relationship; and a third mechanical switch (251). The measuring unit (20) is housed in an upper housing (11) and includes a laser diode (302). In the first positional relationship, the sample table (30) is housed in a lower housing (12). In the second positional relationship, the sample table (30) is exposed to the outside from within the lower housing (12). The third mechanical switch (251) causes a power supply (202) to supply a voltage to the laser diode (302) when a cover (19) of the upper housing (11) is closed, and causes the power supply (202) not to supply the voltage to the laser diode (302) when the cover (19) of the upper housing (11) is opened.

With such a configuration, it is possible to prevent the surface analyzer from malfunctioning due to the user accidentally touching an observed portion or an adjustment knob of the optical microscope or the like when the cover (19) of the upper housing (111) is opened. In addition, it is possible to prevent a laser beam from being emitted when the cover (19) of the upper housing (111) is opened.

(9) Preferably, when the cover (19) is closed, the third mechanical switch (251) is pressed to electrically connect the power supply (202) and the laser diode (302).

With such a configuration, using the third mechanical switch (251), opening and closing of the cover (19) can be detected and the supply of the voltage of the power supply (202) to the laser diode (302) can be controlled.

While the embodiment of the present invention has been described, it should be understood that the embodiment disclosed herein is illustrative and non-restrictive in every respect. The scope of the present invention is defined by the terms of the claims and is intended to include any modifications within the scope and meaning equivalent to the terms of the claims.

What is claimed is:

1. A surface analyzer comprising:
a sample table on which a sample is placed;
a sample table holding unit that holds the sample table;
a measuring unit including a cantilever arranged to face the sample table and a cantilever driving unit that drives the cantilever;
a driving mechanism that relatively displaces the measuring unit and the sample table such that a relative positional relationship between the measuring unit and the sample table is switched between a first positional relationship and a second positional relationship;
a controller; and
a first mechanical switch,
the sample table including a scanner and a sample placement unit,
the measuring unit being housed in an upper housing,
in the first positional relationship, the sample table being housed in a lower housing,
in the second positional relationship, the sample table being exposed to the outside from within the lower housing,
the controller including a high voltage generation circuit that is connected to a power supply and generates a high voltage to be supplied to the scanner,
the first mechanical switch causing the power supply to supply a voltage to the high voltage generation circuit in the first positional relationship, and causing the power supply not to supply the voltage to the high voltage generation circuit in the second positional relationship.

2. The surface analyzer according to claim 1, wherein
when the sample table is taken out, the driving mechanism changes the positional relationship between the sample table and the measuring unit from the first positional relationship to the second positional relationship, by relatively displacing the sample table with respect to the measuring unit such that the measuring unit and the sample table move away from each other in a first direction in which the cantilever and the sample table face each other, and then, sliding the sample table in a second direction intersecting the first direction.

3. The surface analyzer according to claim 2, wherein
the driving mechanism includes the sample table holding unit that holds the sample table, and a movement mechanism that moves the sample table between a measurement position and a sample take-out and scanner replacement position,
the first direction is an up and down direction, and
the movement mechanism moves up and down the sample table holding unit such that the sample table is moved up and down between the measurement position and a retracted position located below the measurement position, and slides the sample table holding unit such that the sample table is moved between the sample take-out and scanner replacement position and the retracted position.

4. The surface analyzer according to claim 3, wherein
when the movement mechanism slides the sample table in the second direction and the positional relationship between the sample table and the measuring unit becomes the first positional relationship, the first mechanical switch is pressed to electrically connect the power supply and the high voltage generation circuit.

5. The surface analyzer according to claim 3, wherein
the measuring unit includes a laser diode,
the surface analyzer further comprises a second mechanical switch that causes the power supply to supply the voltage to the laser diode in the first positional relationship, and causes the power supply not to supply the voltage to the laser diode in the second positional relationship.

6. The surface analyzer according to claim 5, wherein
when the movement mechanism slides the sample table in the second direction and the positional relationship between the sample table and the measuring unit becomes the first positional relationship, the second mechanical switch is pressed to electrically connect the power supply and the laser diode.

7. The surface analyzer according to claim 3, wherein
the movement mechanism includes a support that supports the sample table holding unit, a sliding mechanism that slides the support along a sliding direction in which the sample table holding unit slides, and a moving up and down mechanism that moves up and down the sample table holding unit with respect to the support,
the support is provided to be movable in a prescribed slide section including continuous first and second sections,
with slide movement of the support in the first section, the sample table holding unit is moved up and down with respect to the support by the moving up and down mechanism,
with slide movement of the support in the second section, the sample table holding unit slides along the sliding direction together with the support,
the surface analyzer further comprises a detector that detects a position of the support,
the detector includes a light emitting unit and a light receiving unit that receives light emitted from the light emitting unit,
the sliding mechanism includes a light blocking member that slides with the slide movement of the support,
the detector detects the position of the support when the light emitted from the light emitting unit toward the light receiving unit is blocked by the light blocking member, and
the controller controls slide movement of the sample table based on the position of the support detected by the detector.

8. A surface analyzer comprising:
a sample table on which a sample is placed;
a sample table holding unit that holds the sample table;
a measuring unit including a cantilever arranged to face the sample table and a cantilever driving unit that drives the cantilever;
a driving mechanism that relatively displaces the measuring unit and the sample table such that a relative positional relationship between the measuring unit and the sample table is switched between a first positional relationship and a second positional relationship; and
a mechanical switch,
the measuring unit being housed in an upper housing and including a laser diode,
in the first positional relationship, the sample table being housed in a lower housing,
in the second positional relationship, the sample table being exposed to the outside from within the lower housing, the mechanical switch causes a power supply to supply a voltage to the laser diode when a cover of the upper housing is closed, and causes the power supply not to supply the voltage to the laser diode when the cover of the upper housing is opened.

9. The surface analyzer according to claim 8, wherein when the cover is closed, the mechanical switch is pressed to electrically connect the power supply and the laser diode.

* * * * *